(12) United States Patent
Belkin et al.

(10) Patent No.: US 6,938,085 B1
(45) Date of Patent: Aug. 30, 2005

(54) MECHANISM FOR ENABLING SESSION INFORMATION TO BE SHARED ACROSS MULTIPLE PROCESSES

(75) Inventors: Ruslan Belkin, Mountain View, CA (US); Viswanath Ramachandran, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/574,398

(22) Filed: May 19, 2000

Related U.S. Application Data

(63) Continuation-in-part of application No. 09/524,775, filed on Mar. 14, 2000, now Pat. No. 6,701,367.
(60) Provisional application No. 60/156,305, filed on Sep. 24, 1999, and provisional application No. 60/155,711, filed on Sep. 24, 1999.

(51) Int. Cl.[7] ................................................ G06F 15/16
(52) U.S. Cl. ........................ 709/227; 709/312; 709/228; 709/215; 709/213; 709/214; 711/205
(58) Field of Search ................................. 709/227, 312, 709/228, 215, 213, 214, 217; 711/205

(56) References Cited

U.S. PATENT DOCUMENTS

| | | |
|---|---|---|
| 5,329,589 A | 7/1994 | Fraser et al. |
| 5,410,698 A | 4/1995 | Danneels et al. ........... 395/650 |
| 5,530,852 A | 6/1996 | Meske, Jr. et al. |
| 5,586,312 A | 12/1996 | Johnson et al. |
| 5,691,973 A | 11/1997 | Ramstrom et al. |
| 5,752,031 A | 5/1998 | Cutler et al. |
| 5,790,790 A | 8/1998 | Smith et al. |
| 5,793,415 A | 8/1998 | Gregory, III et al. |
| 5,796,393 A | 8/1998 | MacNaughton et al. |
| 5,809,145 A | 9/1998 | Slik et al. |
| 5,809,248 A | 9/1998 | Vidovic |
| 5,835,724 A | 11/1998 | Smith ..................... 395/200.57 |
| 5,872,963 A | 2/1999 | Bitar et al. |
| 5,913,029 A * | 6/1999 | Shostak ..................... 709/203 |
| 5,918,228 A | 6/1999 | Rich et al. |

(Continued)

OTHER PUBLICATIONS

"System for Dispatching from Multiple Thread Pools", Jan. 1, 1998, IBM Technical Disclosure Bulletin, vol. 41, issue No. 1, pp. 329–332.

Sebastian Wilhelmi, "Re: (ORBit–mt–0.5.7)g_main_iterate():main loop already active in another thread," Jan. 28, 2002, http://mail.gnome.org/archives/orbit–list/2002–January/msg00152.html, printed Oct. 21, 2002, 2 pages.

Sumedh Mungee, "Online CORBA documents," http://www.cs.wustl.edu/~schmidt/CORBA–docs/, printed Oct. 21, 2002, 3 pages.

*Primary Examiner*—Zarni Maung
*Assistant Examiner*—Sahera Halim
(74) *Attorney, Agent, or Firm*—Christian A. Nicholes; Hickman Palermo Truong & Becker LLP

(57) ABSTRACT

A mechanism for enabling session information to be shared across multiple processes in a multi-process environment is disclosed. There is provided a shared persistent memory-mapped file in a file system, which is mapped to the memory space of each of the processes. This file is used by all of the processes to store session information. Because the memory space of each process is mapped to the shared file, each process is able to access and manipulate all of the sessions in the system. Thus, sessions are no longer maintained on a process-specific basis. Rather, they are maintained on a centralized, shared basis. As a result, different requests pertaining to the same session may be serviced by different server processes without any adverse effects. Each process will be able to access and manipulate all of the state information pertaining to that session. By enabling session information to be shared, this mechanism eliminates the session management errors experienced by the prior art.

21 Claims, 6 Drawing Sheets

U.S. PATENT DOCUMENTS

| | | | |
|---|---|---|---|
| 5,928,323 A | 7/1999 | Gosling et al. | 709/203 |
| 5,961,584 A | 10/1999 | Wolf | |
| 5,991,792 A | 11/1999 | Nageswaran | |
| 6,012,090 A | 1/2000 | Chung et al. | 709/219 |
| 6,014,666 A | 1/2000 | Helland et al. | |
| 6,052,711 A | 4/2000 | Gish | |
| 6,058,460 A | 5/2000 | Nakhimovsky | |
| 6,076,108 A * | 6/2000 | Courts et al. | 709/227 |
| 6,088,728 A * | 7/2000 | Bellemore et al. | 709/227 |
| 6,098,093 A * | 8/2000 | Bayeh et al. | 709/203 |
| 6,112,196 A | 8/2000 | Zimowski et al. | |
| 6,125,382 A | 9/2000 | Brobst et al. | |
| 6,128,644 A * | 10/2000 | Nozaki | 709/203 |
| 6,141,684 A | 10/2000 | McDonald et al. | |
| 6,163,801 A * | 12/2000 | O'Donnell et al. | 709/213 |
| 6,182,109 B1 | 1/2001 | Sharma et al. | |
| 6,209,018 B1 * | 3/2001 | Ben-Shachar et al. | 709/105 |
| 6,237,024 B1 | 5/2001 | Wollrath et al. | |
| 6,249,844 B1 | 6/2001 | Schloss et al. | |
| 6,253,239 B1 | 6/2001 | Shklar et al. | |
| 6,260,077 B1 | 7/2001 | Rangarajan et al. | |
| 6,266,661 B1 | 7/2001 | Lewish et al. | |
| 6,304,967 B1 | 10/2001 | Braddy | |
| 6,314,093 B1 | 11/2001 | Mann et al. | |
| 6,317,742 B1 | 11/2001 | Nagaratnam et al. | |
| 6,336,135 B1 * | 1/2002 | Niblett et al. | 709/215 |
| 6,338,064 B1 * | 1/2002 | Ault et al. | 707/9 |
| 6,343,328 B1 | 1/2002 | Murphy, Jr. et al. | |
| 6,374,286 B1 | 4/2002 | Gee et al. | |
| 6,377,999 B1 | 4/2002 | Bartas | |
| 6,393,477 B1 | 5/2002 | Paxhia et al. | |
| 6,397,253 B1 | 5/2002 | Quinlan et al. | |
| 6,415,329 B1 | 7/2002 | Gelman et al. | |
| 6,418,458 B1 | 7/2002 | Maresco | |
| 6,490,624 B1 * | 12/2002 | Sampson et al. | 709/227 |
| 6,542,920 B1 | 4/2003 | Belkin et al. | |
| 6,549,996 B1 * | 4/2003 | Manry et al. | 711/203 |
| 6,557,038 B1 * | 4/2003 | Becker et al. | 709/227 |
| 6,564,252 B1 * | 5/2003 | Hickman et al. | 709/214 |
| 6,604,125 B1 | 8/2003 | Belkin | |
| 6,629,130 B2 | 9/2003 | Mertama et al. | |
| 2004/0064564 A1 | 4/2004 | Belkin | |

* cited by examiner

MECHANISM FOR ENABLING SESSION INFORMATION TO BE SHARED ACROSS MULTIPLE PROCESSES

This application claims the benefit of U.S. Provisional Application entitled "Web Server Architecture", No. 60/156,305, filed Sep. 24, 1999, and U.S. Provisional Application entitled "Web Server Architecture", No. 60/155,711, filed Sep. 24, 1999. This application is also a continuation-in-part of U.S. patent application entitled "Mechanism for Enabling Customized Session Managers to Interact with a Network Server", Ser. No.09/524,775, now U.S. Pat. No. 6,701,367, filed on Mar. 14, 2000. The entire contents of these prior applications are hereby incorporated by reference.

BACKGROUND

This invention relates generally to computer systems, and more particularly to a mechanism for enabling session information to be shared across multiple processes.

On the Internet or World Wide Web, information is generally communicated on a request-response basis. That is, a client (typically running a browser program) submits a service request to a server. The service request may simply ask for a static page (usually in HTML format), or it may request that a particular application or program be executed to generate a return page. In response to the service request, the server performs whatever tasks are necessary to service the request, and provides a response page to the client. This request-response sequence, referred to as a "roundtrip", is carried out for each request.

For simple applications in which every task that needs to be performed can be carried out single roundtrip, statelessness is not a problem. However, for exchanges (such as transactions) that require multiple roundtrips, the lack of state presents a significant impediment.

An example of an application in which it is necessary to maintain state across multiple roundtrips is that of an "electronic shopping cart" application. More specifically, a user visits a merchant's website using a particular client machine. As the user peruses the website, he sees an item that he wishes to purchase, and puts that item into his "shopping cart". As some point, the user invokes a link to another page of the website, and at that point, a request is sent to the server which requests the desired page and which also provides to the server all of the items currently in the shopping cart. The server responds to the request by storing information pertaining to the shopping cart items, and by providing the desired page to the client. Thereafter, the user peruses the new page and puts additional items into the shopping cart. In a subsequent request by the client, the additional items in the shopping are sent to the server. Since the subsequent request is from the same client, the server should associate the additional items with the previous items as being in the same shopping cart. To do this, though, the server needs to associate the subsequent request with the previous request, which in turn requires that the server maintain state information relating to the requests. However, as noted above, the Internet is generally a stateless environment. As a result, without further functionality on the part of the server, multiple roundtrip exchanges, such as those required by the electronic shopping cart application, cannot be implemented on the Internet.

To enable exchanges involving multiple roundtrips to be carried out, some servers implement session management functionality. Basically, this functionality maintains session information across multiple roundtrips so that associations between multiple requests can be made. As used herein, the term session information refers broadly to any information, including state information, which can be used to relate one request with another request. Usually, state information is maintained by passing session ID information back and forth between the client and the server. For example, when a service on the server requiring state information is first invoked by a client request, a new session is created, and a new session ID is associated with the new session. The session acts as a "container" to store all of the necessary state information relating to that particular session. Once the session is created (and possibly updated to include state information relating to processing of the current request), the associated session ID is provided to the client that requested the service. If that client makes a subsequent request to the same service, the client includes in that request the session ID. Using the session ID, the server accesses the associated session, and based upon the state information stored in the associated session, the server can determine what has transpired thus far. In this manner, the server is able to associate a current request with one or more previous requests.

Typically, the session management functionality of a server is process-specific. That is, each instance of the server (with each instance being its own process) maintains session information for its own sessions, and only that process can access and manipulate that session information. This is not a problem if there is only one instance of the server, or if it is guaranteed that the same server instance will service all of the requests pertaining to a particular session. However, where there are multiple instances of the server, and there are no guarantees that the same instance will receive all of the requests pertaining to a particular session, this process-specific limitation of the session management functionality can lead to serious errors.

To illustrate, suppose that there are two instances of a server (i.e. two server processes) running in a particular system, and that requests are distributed to these two server processes in a round-robin fashion. In such a system, it is quite possible for two requests pertaining to the same session to be processed by two different server processes. If that occurs, processing errors may and most likely will occur.

For example, suppose that the first request of a transaction is received and processed by a first server process. In response to this request, the first server process creates a new session, and assigns that new session a session ID. This session ID is returned to the client submitting the request. Suppose further that that same client submits a second request pertaining to the same session, and includes in the second request the session ID that was received from the first server process. Suppose, however, that this second request is received not by the first server process but by a second server process. Because the second server process cannot access the session information of the first server process, it cannot carry on processing of the transaction in the same manner as the first server process. Instead, the second server process may respond in one of several different ways. First, the second server process may simply not recognize the session ID, in which case, it creates a new session and a new session ID. If this occurs, then the same transaction will have two different sessions (one on each server process), with neither session containing all of the state information for the entire transaction. This clearly is not a desirable result. Worse yet, the second server process may recognize the session ID (but this session ID will be associated with another session completely unrelated to the transaction pertaining to the request), and use the state information in that session to service the request. If that occurs, not only will errors arise in servicing the current request, but the data for the other session will also be corrupted. As this discussion shows, the process-specific limitation of the session management functionality can lead to serious errors in a multi-process environment. As a result, an improved mechanism for implementing session management in a multi-process environment is needed.

SUMMARY OF THE INVENTION

In light of the shortcomings of the prior art, the present invention provides a mechanism for enabling session information to be shared across multiple processes in a multi-process environment. In one embodiment, there is provided a shared persistent memory-mapped file in a file system which is mapped to the memory space of each of the processes. This file is used by all of the processes to store session information. Because the memory space of each process is mapped to the shared file, and because each process uses the shared file to stored session information, each process will be able to access and manipulate all of the sessions in the system. Thus, sessions are no longer maintained on a process-specific basis. Rather, they are maintained on a centralized, shared basis. As a result, different requests pertaining to the same session may be serviced by different server processes without any adverse effects. Each process will be able to access and manipulate all of the state information pertaining to that session. By enabling session information to be shared across multiple processes, the present invention eliminates the session management errors experienced by the prior art. Thus, the present invention provides an improved mechanism for managing session information in a multi-process environment.

DETAILED DESCRIPTION OF EMBODIMENT(s)

Figure 1:
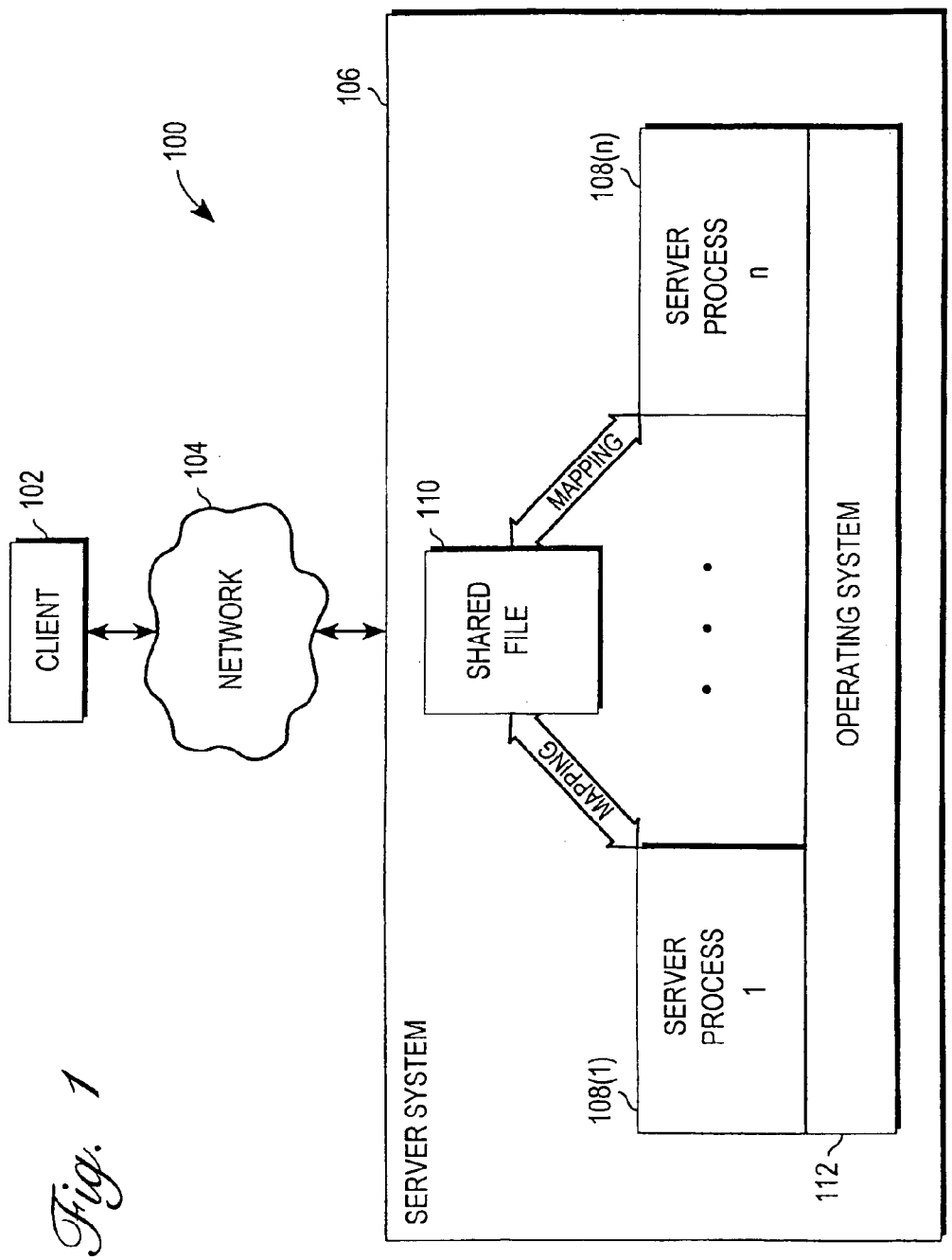
FIG. 1 is a functional block diagram of a system in which one embodiment of the present invention may be implemented.

With reference to FIG. 1, there is shown a functional block diagram of a system 100 in which one embodiment of the present invention may be implemented, the system comprising a client 102, a network 104, and a server system 106. For the sake of simplicity, only one client 102 is shown; however, it should be noted that multiple clients 102 may be coupled to, and communicate with, the server system 106 via the network 104. For purposes of the present invention, the client 102 may be any mechanism capable of communicating with the server system 106, including but not limited to a computer running a browser program. The client 102 may communicate with the server system 106 using any known protocol, including but not limited to HTTP and FTP.

The network 104 may be any type of network, including but not limited to a local area network and a wide area network such as the Internet. The network 104 may even be as simple as a direct connection. Any mechanism capable of facilitating communication between the client 102 and the server system 106 may serve as the network 104.

The server system 106 is the component responsible for providing most of the functionality of the system 100. More specifically, the server system 106 receives requests from the client 102, and responds to the requests by providing response pages. The response pages may be derived by simply accessing static files, or by executing one or more applications to dynamically generate the response pages. The term application is used broadly herein to refer to any type of program or routine that is capable of performing one or more particular functions. What actions need to be carried out by the server system 106 to derive the response pages is typically specified in the requests. Each request-response sequence is referred to as a roundtrip.

As shown in FIG. 1, the server system 106 comprises a plurality of server processes 108. Each server process 108 represents a particular instance of a server, and each instance 108 is fully capable of servicing requests from the client 102. It has been found that running multiple instances of a server 108 concurrently in a system gives rise to certain advantages. These advantages include the ability to load balance across the different server processes 108, and the ability for one server process 108 to seamlessly service the requests of another server process should that other process become disabled.

In a multi-process system such as that shown in FIG. 1, requests are distributed among the various server processes 108 for servicing. In one embodiment, the requests are distributed by an operating system 112. For purposes of the present invention, the operating system may be any operating system, including but not limited to UNIX, Solaris, and Windows NT. The operating system 112 distributes requests by first monitoring one or more ports (not shown) of the server system 106 for incoming client requests. When a client request is detected, it is assigned to one of the server processes 108 for servicing. In determining to which server process 108 the request is to be assigned, the operating system 112 may implement any desired distribution scheme. For example, the operating system 112 may assign requests to the server processes 108 according to a round-robin scheme, a load-based scheme, or a priority-based scheme, to name a few. For purposes of the present invention, any distribution scheme may be used. Because incoming requests may be distributed to the server processes 108 according to any desired scheme, there is no guarantee that any particular server process 108 will receive all of the requests pertaining to a particular session. Thus, there is a good likelihood that the multiple requests pertaining to a particular session will be serviced by different server processes 108. To accommodate this possibility, the present invention implements the shared file 110 of FIG. 1.

In one embodiment, the shared file 110 takes the form of a memory-mapped file in a file system, which is mapped to the memory space of each of the server processes 108. This file 110 is used by each of the processes 108 to store session information. Because this file 110 is used by all of the processes 108 to store session information, and because it is mapped to the memory space of each of the server processes 108, each process 108 will be able to access and to manipulate the session information for all of the sessions in the server system 106. Thus, session information is no longer maintained on a process-specific basis. Rather, it is maintained on a centralized, shared basis. Because session information is maintained on a shared basis, any process 108 will be able to service any request pertaining to any session without losing any session information or corrupting any session data. Thus, by sharing session information across multiple processes, the present invention makes it possible to effectively and safely implement session management in a multi-process environment. In one embodiment, the shared file 110 is maintained as a persistent file. That is, it is stored persistently such that if one or even all of the server processes 108 are terminated, the file 110 is not eliminated. As a persistent file, it may be stored in memory, on mass storage such as a hard drive, or both.

Figure 2:
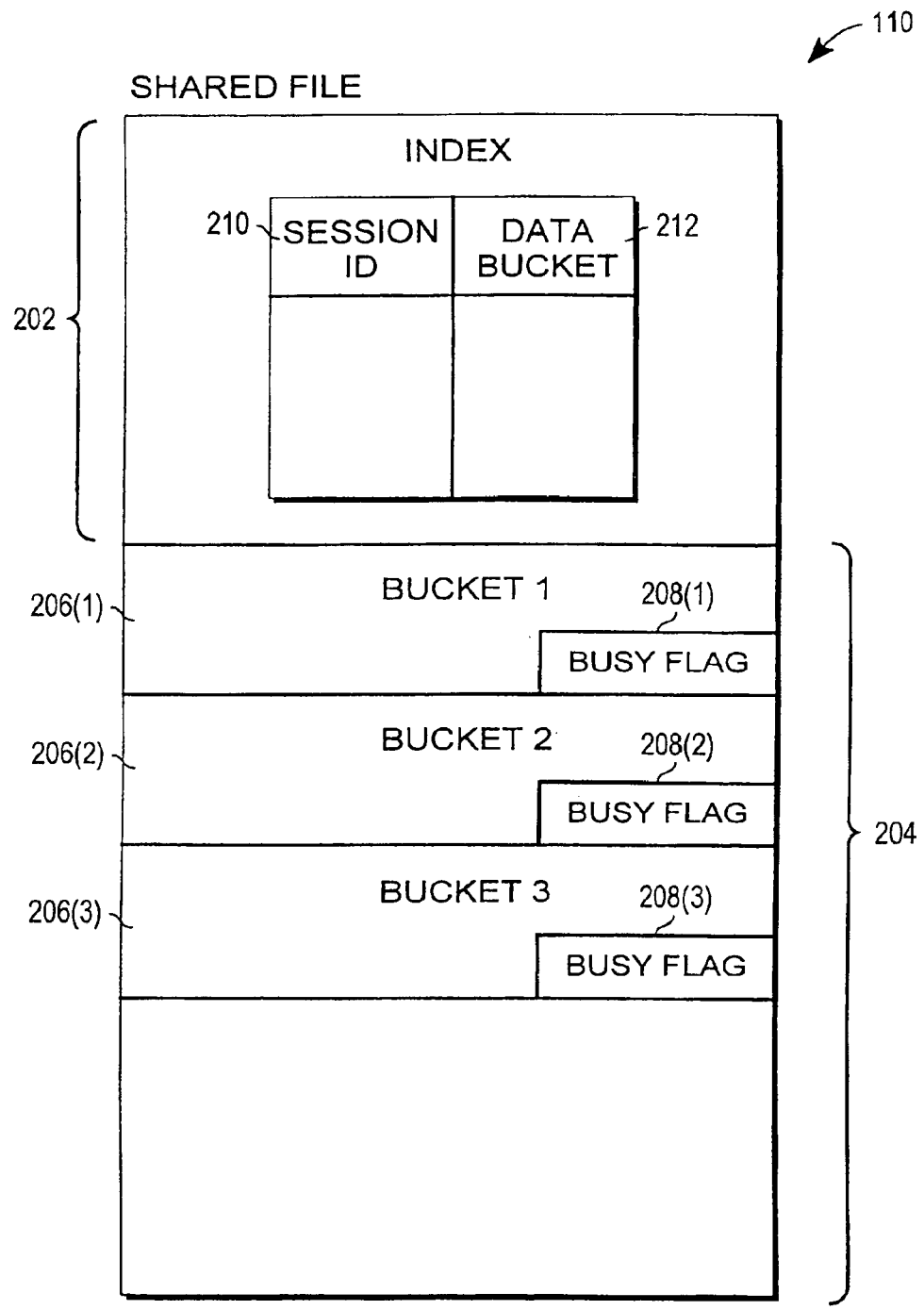
FIG. 2 is a diagram of one possible embodiment for the shared file of FIG. 1.

In one embodiment, the shared file 110 takes the form show in FIG. 2, comprising an index portion 202 and a data portion 204. The index portion 202 contains information for facilitating access to the data portion 204, and the data portion 204 contains the actual session information. In one embodiment, the data portion 204 is divided into a plurality of fixed-sized data buckets 206, with each data bucket 206 (if that bucket is being used to hold session information) being associated with a particular session ID, and each bucket storing session information for a particular session. In addition to storing actual session information, each data bucket 206 also stores a busy flag 208. When set, this flag 208 indicates that a particular set of session information is currently in use (i.e. that a request pertaining to that session is currently being serviced). As will be explained further below, busy flag 208 may be used by the server processes 108 to prevent more than one process 108 from working on a session at a time.

The associations between the buckets 206 and the session ID's are stored in the index portion 202. In one embodiment, the associations are stored in the form of a table comprising a session ID column 210 and a data bucket column 212. The session ID column 210 stores a particular session ID, and the data bucket column 212 stores a reference to one of the data buckets 206 with which a particular session ID is associated. A session ID may be associated with more than one data bucket 206 if one data bucket is not large enough to hold all of the session information for a particular session. To facilitate access to the data buckets 206, the index table is indexed by session ID. Thus, the data buckets 206 are accessed based upon session ID's. The shared file 110 is used by all of the server processes 108 to store and to retrieve all session information. The manner in which this is done will be discussed in detail in a later section.

Figure 3:
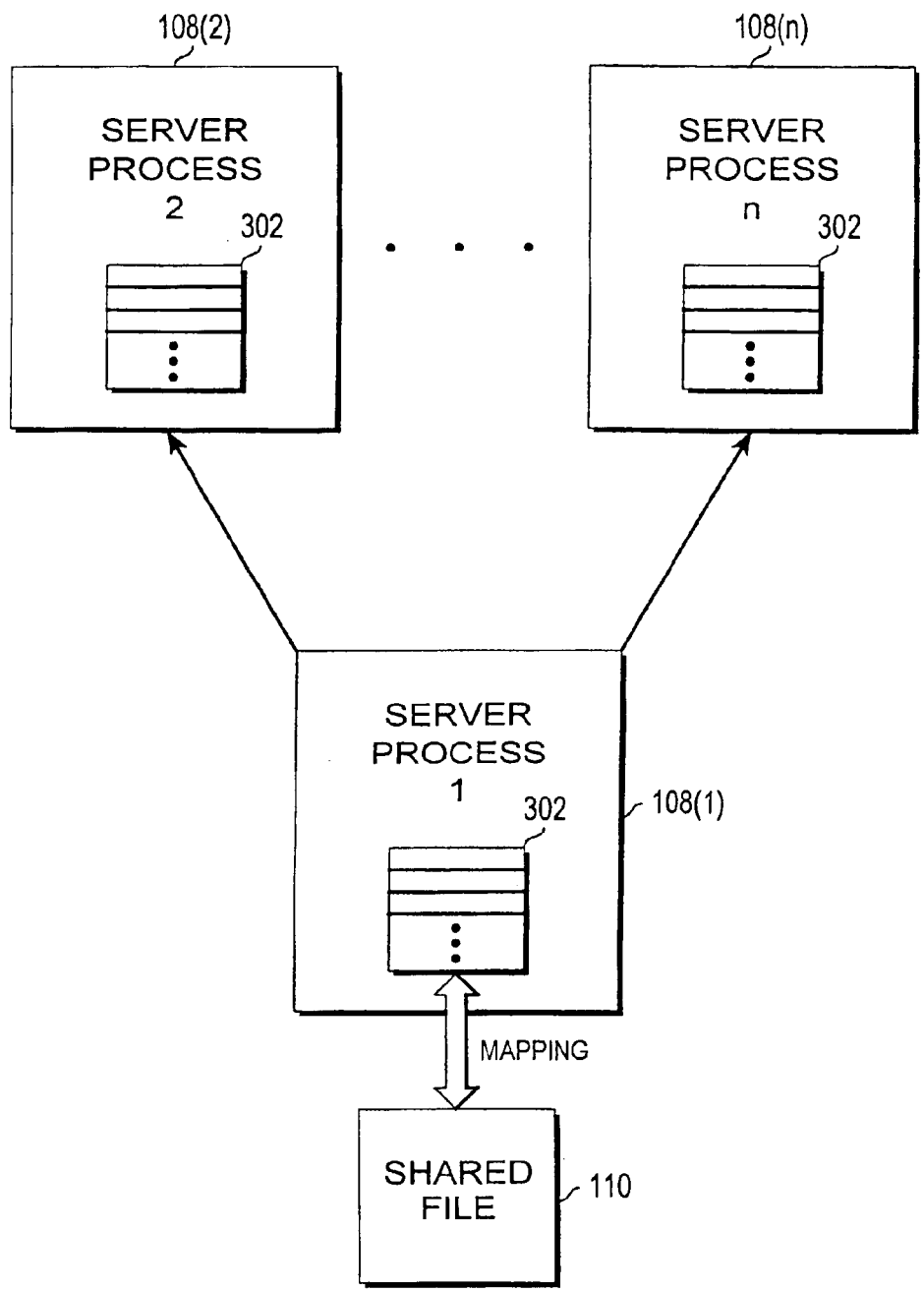
FIG. 3 is a logical block diagram illustrating the process by which multiple server processes are instantiated and mapped to the shared file of FIG. 1.

As mentioned above, the shared file 110 is memory-mapped to the memory space of each of the server processes 108. In one embodiment, this is done during system startup up using a particular initialization process. With reference to FIG. 3, this process will be described in greater detail. During system start-up, a number of initialization operations are performed. These operations may be grouped into two sets: an early set; and a late set. In one embodiment, the early set of initialization operations is performed by one server process, while the late set of initialization operations is performed by all of the server processes.

More specifically, at system start-up, a single server process 108(1) is instantiated. This process 108(1), referred to below as the primary process, is the one that performs the early set of initialization operations. Among others, one of the early initialization operations performed by the primary process 108(1) is the creation of the shared file 110. This shared file 110 is created in a portion of physical storage, and is made a part of the file system. Once created, the file 110 is memory-mapped to a portion 302 of the virtual memory space of the primary process 108(1). Once the file 110 is memory-mapped, it may be accessed by the primary process 108(1) to read and to write data.

Thereafter, the primary process 108(1) continues to carry out the operations comprising the early set of initialization operations. At some point, the primary process 108(1) completes performance of the early set of operations, and when that occurs, the primary process 108(1) spawns or "forks off" other server processes 108(2)–108(n). When a server process 108(2)–108(n) is forked off of the primary process 108(1), a copy of the primary process's memory space 108(1) is made. This copy is used as the starting point for the memory spaces of the other server processes 108(2)–108(n). Because this memory space is already memory-mapped to the shared file 110, and because it is used as the starting point for all of the memory spaces of the other server processes 108(2)–108(n), it follows that the memory spaces of all of the other processes 108(2)–108(n) are also memory-mapped to the shared file 110. In this manner, all of the server processes 108 are memory-mapped to the shared file 110 at initialization time. After the server processes 108(2)–108(n) are forked off, each of the processes 108 carries out the late set of initialization operations. Once those operations are performed, the various server processes 108 are ready for regular operation.

During regular operation, the server processes 108 access the shared file 110 (FIG. 1) to store and to retrieve session information. The manner in which the processes 108 utilize the shared file 110 is best understood with reference to an example. Suppose that a request is received from a client 102 to start a new session, and that this request is assigned to server process 108(1). Since this is a request to start a new session, server process 108(1) will create a new session and an associated new session ID. To determine which session ID to assign to the new session, the server process 108(1) consults the index portion 202 of the shared file 110 (FIG. 2), and more specifically, the session ID column 210 of the index table. Based upon the current session ID values, the server process 108(1) creates a new unique session ID, and associates it with the new session. Thereafter, the new session ID is inserted into the session ID column 210 of a new row of the index table. In addition, a reference to a free data bucket is inserted into the data bucket column 212 of that same row (for the sake of example, it will be assumed that the free data bucket is bucket 206(1)). The association between the session ID and the free data bucket 206(1) is thus made. Thereafter, bucket 206(1) will be used to store the session information for the new session.

A In updating the index portion 202 of the shared file 110, the server process 108(1) takes precautions to ensure that other processes 108 are not also updating the index table at the same time. If simultaneous update occurs, processing errors may result. To prevent simultaneous update, the server process 108(1) obtains a lock on the index portion 202 prior to any update. In one embodiment, the lock is obtained by requesting and obtaining a semaphore from the operating system 112. Once the semaphore is obtained, the server process 108(1) is free to update the index portion 202. As soon as updating of the index portion 202 is completed, the server process 108(1) releases the semaphore, thereby enabling the other processes 108 to update the index portion 202, if so desired. In this manner, the index portion 202 is updated safely.

Once the index portion 202 is updated, the data bucket 206(1) associated with the new session ID is accessed, and the busy flag 208(1) stored therein is set to indicate that the session associated with the bucket 206(1) is currently being serviced. With that done, the server process 108(1) proceeds to service the request. In servicing the request, session information may be generated. When servicing of the request is completed, the server process 108(1) stores this session information into the data bucket 206(1). In addition, the server process 108(1) resets the busy flag 208(1) to indicate that the session is no longer being serviced. Furthermore, the server process 108(1) sends the new session ID and a response page to the client 102 as a response to the request. Once that is done, the request is fully serviced.

Suppose now that the client 102 sends a second request pertaining to the same session, and includes in the second request the session ID received in response to the first request. Suppose, though, that this second request is assigned to server process 108(n), not server process 108(1). This situation would have posed a problem for the prior art; however, with the present invention's ability to share session information across multiple processes, this second request is processed properly, just like any other request. More specifically, in response to the second request, the server process 108(n) determines whether the request pertains to an already existing session. Since the request includes a session ID, it is clear that it does pertain to an existing session. That being the case, the server process 108(n) uses the session ID to find the associated data bucket in which session information pertaining to this session is stored. More specifically, the server process 108(n) compares the session ID with the session ID's stored in the session ID column 210 of the index table. Unless there is an error, or the ID has expired, a matching entry will be found. The data bucket reference contained in that matching entry will lead the server process 108(n) to the proper data bucket. In this example, it is data bucket 206(1).

Once the associated data bucket 206(1) is determined, it is accessed by the server process 108(n). In one embodiment, the server process 108(n) first checks the busy flag 208(1) stored in the bucket 206(1) to determine whether it has been set. If so, then it means that that session is currently being serviced by another process 108. In such a case, the server process 108(n) waits until the busy flag 208(1) is reset before processing the second request. This ensures that a session is serviced by only one process 108 at a time to prevent potential processing errors. On the other hand, if the busy flag 208(1) is not set, then the server process 108(n) sets the flag 208(1), and then proceeds to retrieve the session information from the bucket 206(1). This session information is the same information as that stored by the server process 108(1) after servicing the first request. Thus, it contains all of the session information pertaining to this session. Thereafter, the server process 108(n) uses the session information to service the second request. In servicing the second request, the session information may be modified, and additional session information may be generated. When the server process 108(n) completes servicing of the second request, it stores all of the session information back into the data bucket 206(1). In addition, it resets the busy flag 208(1) to indicate that the session is no longer being serviced. Furthermore, the server process 108(n) sends the session ID and a response page to the client 102 as a response to the second request. Once that is done, the second request is fully and properly serviced. Note that although the first and second requests were processed by different server processes 108(1), 108(n), both requests were serviced properly. No session information was lost, and no session information was corrupted. Therefore, as this discussion shows, the present invention makes it possible to manage session information safely in a multi-process environment.

Thus far, the invention has been described at a relatively high level. With reference to the functional block diagram of FIG. 4, which shows one possible embodiment for the server processes 108 of FIG. 1, the invention will now be described in greater detail. In the embodiment shown, each server process 108 comprises a listener 410, a set of name translation functions 412, and a set of service subsystems 414. The primary function of the listener 410 is to receive a client request, parse the request into its various components (e.g. method, headers, universal resource identifier (URI), parameters, etc.), and store the various components into predefined structures. Once the request is parsed, it is ready for processing by the other components of the server process 108.

In particular, the name translation functions 412 determine, based upon the URI of the request, which of the service subsystems 414 need to be invoked in response to the request. In one embodiment, there is a name translation function associated with each of the subsystems 420, 422, 424 in the service subsystems 414. These name translation functions are executed in turn to determine which subsystem 420, 422, 424 needs to be invoked to process the request. For example, the name translation function associated with the HTML engine 422 is invoked to determine whether the HTML engine 422 needs to be invoked to respond to the request. If not, then the name translation function associated with the service engine 420 is invoked to determine whether the service engine 420 needs to be invoked to respond to the request. This process of executing the name translation functions 412 continues until it is determined which of the service subsystems 414 needs to be invoked to process the request. Once the proper subsystem is determined, processing of the request continues with that subsystem.

Figure 4:
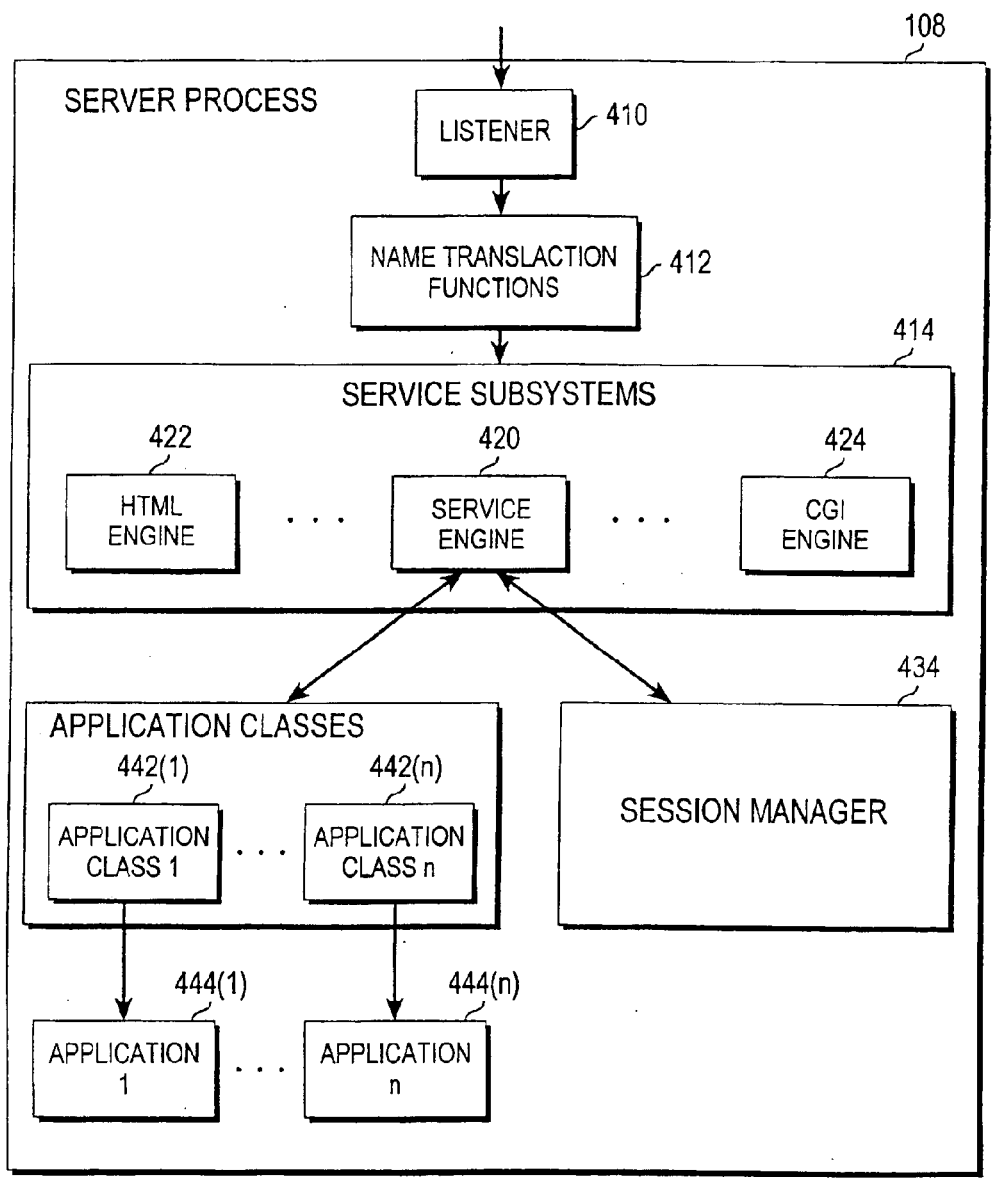
FIG. 4 is a functional block diagram of one possible embodiment of a server process in accordance with one embodiment of the present invention.

As shown in FIG. 4, one of the service subsystems is the service engine 420. In one embodiment, the service engine 420 coordinates interaction between the applications 444 and the session manager 434 to manage session (i.e. state) information for exchanges that span multiple client requests. In carrying out its coordination function, the service engine 420 performs at least three major functions. First, it determines based upon the URI of the client request which application class 442 needs to be invoked to process the client request. Then, it invokes the proper application class 442 to give rise to an application instance 444. Thereafter, the service engine 420 invokes the session manager 434. Once that is done, the application instance 444 and the session manager 434 interact with each other to access and to update session information relating to a particular session.

To enable the service engine 420 to determine which application class 442 to invoke in response to a particular URI, each application class 442 is registered. In one embodiment, this registration takes the form of an entry in a configuration file. This entry comprises a reference to a particular application class 442, and a URI associated with that class 442. Given this information, the service engine 420 can determine, based upon the URI of the request, which application class 442 to invoke to service the request.

In addition to invoking the application classes 442, the service engine 420 also invokes the session manager 434. In one embodiment, the service engine 420 invokes the functionality of the session manager 434 via a set of methods implemented by the session manager 434. According to one embodiment, these methods include: (1) Init; (2) CreateSession; (3) DeleteSession; (4) GetSession; (5) PutValue; (6) GetValue; (7) Update; and (8) Reaper.

The Init method is called upon initialization of the session manager 434 and is called only once. When invoked, the Init method prepares the session manager 434 for normal operation. The CreateSession method is invoked when a new session needs to be created. This typically occurs when a client invokes an application class 442 for the first time. The DeleteSession method is invoked to render an existing session invalid. This may occur at the end of a transaction or when a session "times out". The GetSession method is invoked to access an existing session. This is used to continue an ongoing session. The PutValue method is invoked to write information into an existing session. This is usually invoked to write additional state information into an existing or new session. The GetValue method is invoked to retrieve state information from an existing session. This method makes it possible to ascertain what has transpired thus far in a particular session. The Update method is invoked when current processing of a session is completed. It gives the session manager 434 an opportunity to perform certain functions, such as storing the session information persistently into the shared file 110, to complete the servicing of a request. The Reaper method is invoked periodically by an external mechanism (such as a dedicated thread) to cause the session manager 434 to delete old or invalid sessions. This method causes the session manager 434 to perform "clean up" operations on outdated sessions.

In maintaining state information pertaining to sessions, the session manager 434 uses session objects. More specifically, the session manager 434 instantiates a session object for each session, and that session object is used as a container to store session information for that session. These session objects are instantiated from a session object class, which defines and implements a plurality of methods. Two methods defined and implemented by the session object class are the PutValue and the GetValue methods. The PutValue method is invoked to write additional information into a session object, while the GetValue method is invoked to retrieve information from a session object. In one embodiment, the implementations for these methods are straightforward: they invoke the corresponding methods on the session manager 434. That is, the PutValue method of the session object class invokes the PutValue method of the session manager 434, and the GetValue method of the session object class invokes the GetValue method of the session manager 434. Thus, in one embodiment, it is the session manager 434 that actually writes and retrieves information pertaining to a session.

Another method implemented by the session object class is the GetAccessTime method. When invoked, this method returns the time of the last access of a particular session object. This method may be used by the session manager 434 to determine whether a particular session has "timed out". Yet another method implemented by the session object class is the IsValid method. This method is invoked to determine whether a session object is valid and may still be used.

In addition to its own defined methods, the session object class further implements methods defined in a "serializable" interface. This interface comprises a WriteObject method and a ReadObject method. The WriteObject method converts a session object into a serialized byte stream (i.e. serializes the object), while the ReadObject method restores a serialized byte stream into a session object (i.e. deserializes the object). These methods are invoked by the session manager 434 to store session information into, and to read session information out of the shared file 110. These methods make it possible to store session information in the shared file 110 in the form of byte streams. By storing session information in the form of byte streams, use of the session information by multiple processes 108 is facilitated.

To elaborate, when an object is serialized into a byte stream, all of its references to other objects are removed. More specifically, the object and all of the objects referenced by it are broken down into their fundamental elements. By breaking down an object, and by removing its references to other objects, the sharing of the object among multiple processes is made much simpler. This is because object references typically reside only in the runtime environment of a particular process. Because this runtime environment is not stored with the object, and because the runtime environment of one process cannot be accessed by another process, it is difficult for one process to use an object stored by another process if that object contains references to other objects. This problem is solved by serializing the object at the time the object is stored. Since serializing the object removes all references to other objects, processes will not need to resolve object references when they use the object. Instead, all they will need to do is to deserialize the object to recreate it. This deserialization can be carried out by a process without reference to the runtime environment of any other process. Thus, by serializing an object, the passing of the object among multiple processes is made much simpler. The use of the WriteObject and ReadObject methods of the session object class will be described in more detail in a later section.

Figure 5:
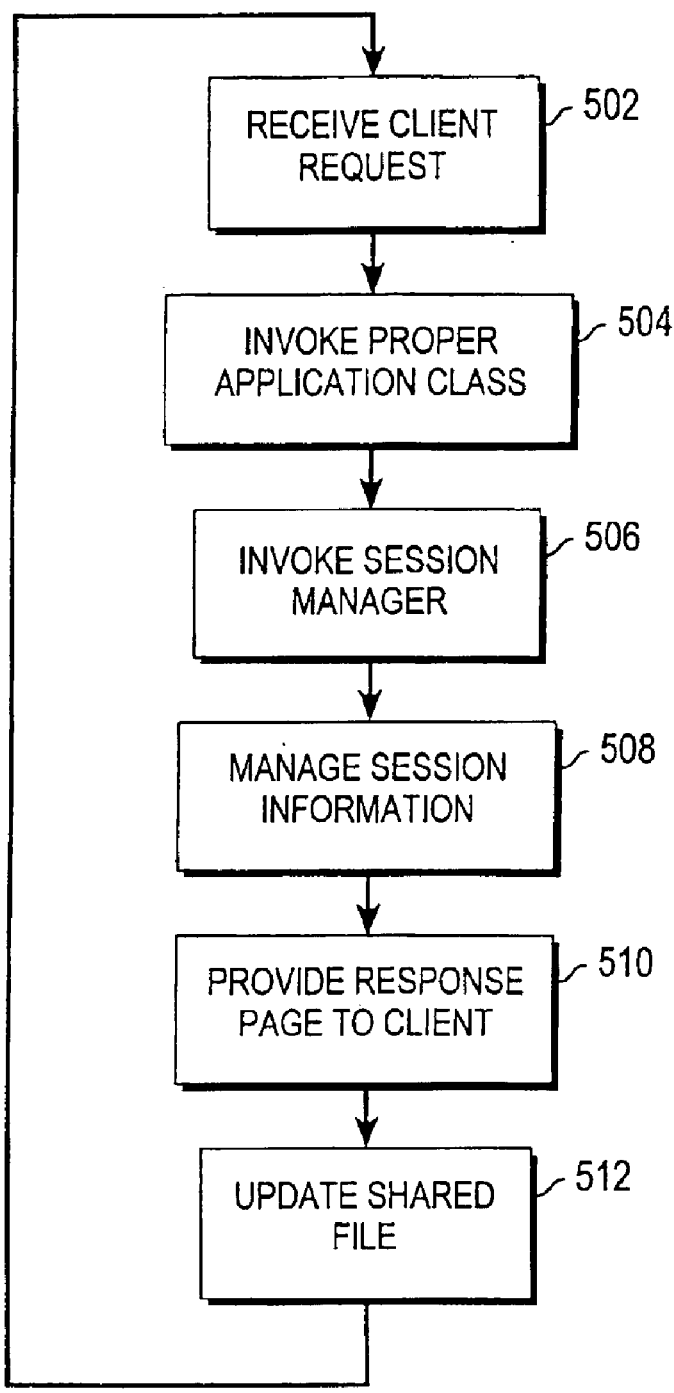
FIG. 5 is an operational flow diagram for the server process of FIG. 4.

The structure of the server process 108 has been disclosed. With reference to FIG. 4 and the flow diagram of FIG. 5, the operation of the server process 108 will now be described. FIG. 5 presents an overview of the interaction between the service engine 420, the application classes 442, and the session manager 434. Basically, the service engine 420 receives (502) a client request after the request has been parsed by the listener 410 and determined by the name translation functions 412 to be eligible for processing by the service engine 420. This client request may or may not include (as will be explained further below) a session ID. The session ID may be provided as part of the URI, or in the form of a "cookie", or both. Based upon the URI, the service engine 420 determines which of the application classes 442 to invoke to process the request. In one embodiment, this determination is made by consulting the configuration file previously described.

Once the service engine 420 determines the proper application class 442, it invokes (504) the application class 442 to give rise to an application instance 444. The application instance 444 then starts executing to process the client request. If the application instance 444 is of the type that processes exchanges involving multiple roundtrips, and hence, requires session information to be maintained, then one of the first acts of the application instance 444 is to request a session object from the service engine 420. If a session ID was included with the client request (thereby indicating that this client request relates to an already existing session object), then the service engine 420 uses the provided session ID to get the requested session object. If no session ID was included with the client request, then the service engine 420 generates a new session ID. In one embodiment, the service engine 420 generates a new session ID by first consulting the index portion 202 (FIG. 2) of the shared file 110, and more specifically, the session ID column 210 of the index table. Then, based upon the current session ID values, the service engine 420 creates a new unique session ID, and associates it with the new session.

To get a session object for the application instance 444, the service engine 420 invokes (506) the session manager 434. In one embodiment, the service engine 420 invokes the session manager 434 by calling one of the methods implemented by the session manager 434. More specifically, if the service engine 420 just generated a new session ID and, hence, needs a new session object to be created, then the service engine 420 calls the CreateSession method of the session manager 434. If the service engine 420 was provided a session ID with the client request, then the service engine 420 calls the GetSession method of the session manager 434 to get an already existing session object. With either call, the service engine 420 passes a session ID to the session manager 434.

In response to a CreateSession call, the session manager 434: (1) instantiates a new session object; (2) associates the session ID received from the service engine 420 with the new session object; and (3) inserts into the new session object a pointer to the session manager 434. In addition, the session manager 434 updates the shared file 110 (FIG. 2) with the new session ID information. In doing so, the session manager 434 requests and obtains a semaphore from the operating system 112 (FIG. 1) to lock the index portion 202 of the shared file 110. Once the semaphore is obtained, the session manager 34 inserts the session ID into the session ID column 210 of a new row in the index table. In addition, the session manager 434 inserts a reference to a free bucket into the data bucket column 212 of that same row (assume for the sake of example that the free bucket is bucket 206(1)). The association between the session ID and the free bucket 206(1) is thus made, and the index portion 202 of the shared file 110 is thus updated. The session manager 434 then releases the semaphore to free the index portion 202. Thereafter, the session manager 434 accesses the bucket 206(1) associated with the session ID, and sets the busy flag 208(1) in that bucket 206(1). This indicates to other processes 108 that the session associated with the bucket 206(1) is currently being serviced. Once that is done, the session manager 434 returns to the service engine 420 a reference to the new session object. That session object may thereafter be used by the application instance 444 to maintain session information while servicing the client request.

In response to a GetSession call, the session manager 434 behaves differently. Rather than instantiating a new session object, the session manager 434 searches for and recreates an existing session object. To do so, the session manager 434 uses the shared file 110 and the session ID provided by the service engine 420. More specifically, the session manager 434 compares the session ID received from the service engine 420 with the session ID's stored in the session ID column 210 of the shared file's 110 index table (FIG. 2). Unless there is an error, or the ID has expired, a matching entry will be found. That matching entry will contain in the data bucket column 212 a reference to the data bucket in which the session object associated with that session ID is stored. Using that reference, the session manager 434 accesses the associated data bucket (assume for the sake of example that the associated bucket is 206(2)). Once the associated data bucket 206(2) is accessed, the session manager 434 checks the busy flag 208(2) stored in the bucket 206(2) to determine whether it has been set. If so, then it means that that session is currently being serviced by another process 108. In such a case, the session manager 434 waits until the busy flag 208(2) is reset before proceeding further. This ensures that a session is serviced by only one process 108 at a time to prevent potential processing errors. On the other hand, if the busy flag 208(2) is not set, then the session manager 434 sets the flag 208(2), and then proceeds to recreate a session object from the session information stored in the bucket 206(2). As noted previously, session information is stored in the shared file 110 in the form of serialized byte streams. To recreate the session object from the session information, the session manager 434 deserializes the byte stream. In one embodiment, this is done by calling the ReadObject method of the session object class. After the session information is deserialized and the session object is created, the session manager 434 returns to the service engine 420 a reference to the recreated session object. That session object may thereafter be used by the application instance 444 to maintain session information while servicing the client request.

In response to either the CreateSession or the GetSession method call, a session object reference is returned to the service engine 420 (unless the session object associated with the session ID is no longer valid). Once the service engine 420 receives the session object reference, it passes the object reference on to the application instance 444. Thereafter, the application instance 444 interacts with the session object referenced by the object reference to access and to update session information. To add session information to the session object, the application instance 444 calls the PutValue method of the session object. To get session information from the session object, the application instance 444 calls the GetValue method of the session object. As noted previously, the PutValue and GetValue methods of the session object call the corresponding PutValue and GetValue methods of the session manager 434. Thus, it is really the session manager 434 that accesses, updates, and manages (508) the session information relating to a session object. This interaction between the application instance 444, the session object, and the session manager 434 continues until the application instance 444 completes processing of the client request.

At that point, the application instance 444 generates and provides a response page to the service engine 420. In turn, the service engine 420 provides (510) the response page, along with the session ID, to the client 102. The session ID may be provided to the client 102 either in the form of a "cookie", as part of the URI, or both. This session ID is used by the client 102 in future related requests. In addition, the service engine 420 calls the update method of the session manager 434 to give the session manager 434 an opportunity to perform any final session management functions. This method call includes a session ID and an associated session object reference. In response, the session manager 434 stores the session object back into the shared file 110 to update (512) the file 110. To do so, the session manager 434 first compares the session ID received from the service engine 420 with the session ID's stored in the session ID column 210 of the shared file's 110 index portion 202 (FIG. 2). Unless there is an error, a matching entry will be found. Using the data bucket reference stored in the data bucket column 212 of that matching entry, the session manager 434 accesses the data bucket 206 associated with the session ID (for the sake of example, it will be assumed that the associated data bucket is bucket 206(1)). Once the associated data bucket 206(1) is accessed, the session manager 434 stores the referenced session object into the data bucket 206(1). As mentioned previously, session information is stored in the shared file 110 in the form of serialized byte streams. Thus, before the session object is stored, it is first serialized. In one embodiment, the session object is serialized by calling the WriteObject method of the object. Once the session object is serialized, it is stored into the associated data bucket 206(1). Thereafter, the session manager 434 resets the busy flag 208(1) stored in the associated data bucket 206(1) to indicate that the session is no longer being serviced. With that done, processing of the client request is complete. Thereafter, the service engine 420 loops back to (502) to process another client request.

Hardware Overview

Figure 6:
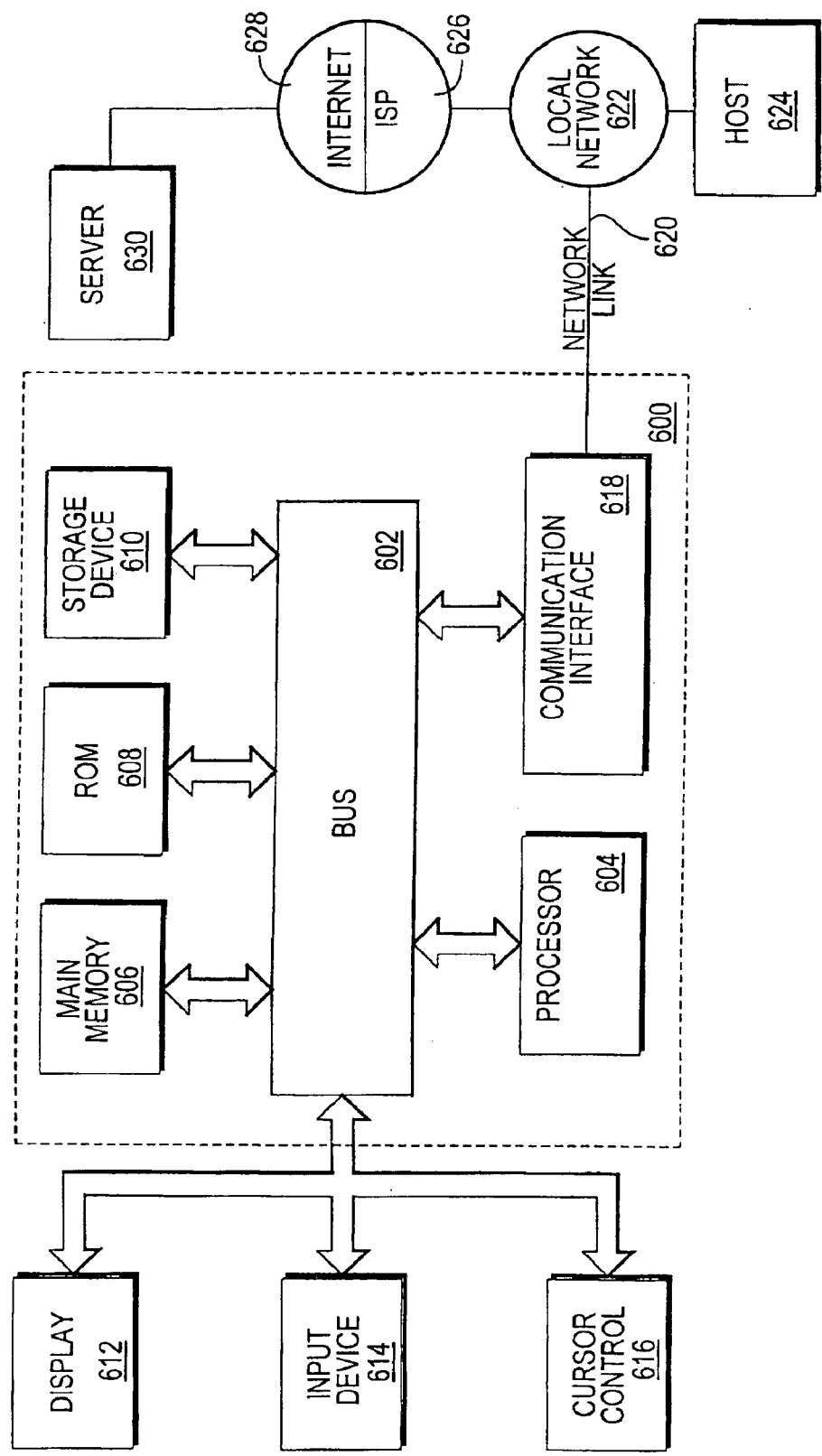
FIG. 6 is a hardware block diagram of a computer system in which one embodiment of the present invention may be implemented.

In one embodiment, the present invention is implemented as a set of instructions executable by one or more processors. The invention may be implemented as part of an object oriented programming system, including but not limited to the Java™ programming system manufactured by Sun Microsystems, Inc. of Mountain View, Calif. FIG. 6 shows a hardware block diagram of a computer system 600 in which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 may also be further used to store temporary variables or other intermediate information during execution of instructions by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

According to one embodiment, the functionality of the present invention is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various-networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer system, comprising:
   a memory-mapped file;
   a first server process, said first server process servicing a first request pertaining to a particular session, said first server process storing session information pertaining to said particular session in said memory-mapped file; and
   a second server process, said second server process servicing a second request pertaining to said particular session, said second server process accessing said session information from said memory-mapped file and using said session information to service said second request;
   wherein said memory-mapped file is mapped to at least a portion of a virtual memory space of said first server process and at least a portion of a virtual memory space of said second server process.

2. The system of claim 1, wherein said first server process stores said session information into said memory-mapped file in the form of a serialized byte stream.

3. The system of claim 2, wherein said second server process deserializes said serialized byte stream prior to using said session information to service said second request.

4. The system of claim 1, wherein said second server process sets a busy indicator associated with said session information to indicate that said session information is currently in use, thereby preventing any other server process from using said session information while said second server process is using said session information.

5. The system of claim 1, wherein said second server process updates said session information to derive a set of updated session information, and wherein said second server process stores said updated session information in said memory-mapped file.

6. The system of claim 5, wherein said updated session information replaces said session information in said memory-mapped file.

7. The system of claim 6, further comprising:
   a third server process, said third server process servicing a third request pertaining to said particular session, said third server process accessing said updated session information from said memory-mapped file and using said updated session information to service said third request.

8. A computer-implemented method for servicing requests, comprising:
   instantiating a first server process;
   instantiating a second server process;
   receiving a first request pertaining to a particular session;
   servicing said first request with said first server process, said first server process storing session information pertaining to said particular session in a memory-mapped file;
   receiving a second request pertaining to said particular session; and
   servicing said second request with said second server process, said second server process accessing said session information from said memory-mapped file and using said session information to service said second request;
   mapping at least a portion of a virtual memory space of said first server process to said memory-mapped file; and
   mapping at least a portion of a virtual memory space of said second server process to said memory-mapped file.

9. The method of claim 8, wherein said first server process stores said session information into said memory-mapped file in the form of a serialized byte stream.

10. The method of claim 9, wherein said second server process deserializes said serialized byte stream prior to using said session information to service said second request.

11. The method of claim 8, wherein servicing said second request comprises:
    setting a busy indicator associated with said session information to indicate that said session information is currently in use, thereby preventing any other server process from using said session information while said second server process is using said session information.

12. The method of claim 8, wherein servicing said second request comprises:
    updating said session information to derive a set of updated session information; and
    storing said updated session information into said memory-mapped file.

13. The method of claim 12, wherein storing said updated session information into said memory-mapped file comprises: overwriting said session information with said updated session information.

14. The method of claim 13, further comprising:
    instantiating a third server process;
    receiving a third request pertaining to said particular session; and
    servicing said third request with said third server process, said third server process accessing said updated session information from said memory-mapped file and using said updated session information to service said third request.

15. A computer readable medium having stored thereon instructions which, when executed by one or more processors, cause the one or more processors to service requests, said computer readable medium comprising
    instructions for causing one or more processors to instantiate a first server process;
    instructions for causing one or more processors to instantiate a second server process;
    instructions for causing one or more processors to receive a first request pertaining to a particular session;
    instructions for causing one or more processors to service said first request with said first server process, said first server process storing session information pertaining to said particular session in a memory-mapped file;
    instructions for causing one or more processors to receive a second request pertaining to said particular session; and
    instructions for causing one or more processors to service said second request with said second server process, said second server process accessing said session information from said memory-mapped file and using said session information to service said second request;
    instructions for causing one or more processors to map at least a portion of a virtual memory space of said first server process to said memory-mapped file; and instructions for causing one or more processors to map at least a portion of a virtual memory space of said second server process to said memory-mapped file.

16. The computer readable medium of claim 15, wherein said first server process stores said session information into said memory-mapped file in the form of a serialized byte stream.

17. The computer readable medium of claim 16, wherein said second server process deserializes said serialized byte stream prior to using said session information to service said second request.

18. The computer readable medium of claim 15, wherein the instructions for causing one or more processors to service said second request comprises:

instructions for causing one or more processors to set a busy indicator associated with said session information to indicate that said session information is currently in use, thereby preventing any other server process from using said session information while said second server process is using said session information.

19. The computer readable medium of claim 15, wherein the instructions for causing one or more processors to service said second request comprises:

instructions for causing one or more processors to update said session information to derive a set of updated session information; and instructions for causing one or more processors to store said updated session information into said memory-mapped file.

20. The computer readable medium of claim 19, wherein the instructions for causing one or more processors to store said updated session information into said memory-mapped file comprises:

instructions for causing one or more processors to overwrite said session information with said updated session information.

21. The computer readable medium of claim 20, further comprising:

instructions for causing one or more processors to instantiate a third server process;

instructions for causing one or more processors to receive a third request pertaining to said particular session; and instructions for causing one or more processors to service said third request with said third server process, said third server process accessing said updated session information from said memory-mapped file and using said updated session information to service said third request.

* * * * *